Dec. 3, 1963   R. H. DOGGETT ETAL   3,112,518
APPARATUS FOR CLEANING ANIMAL TISSUE
Filed March 30, 1960   6 Sheets-Sheet 1
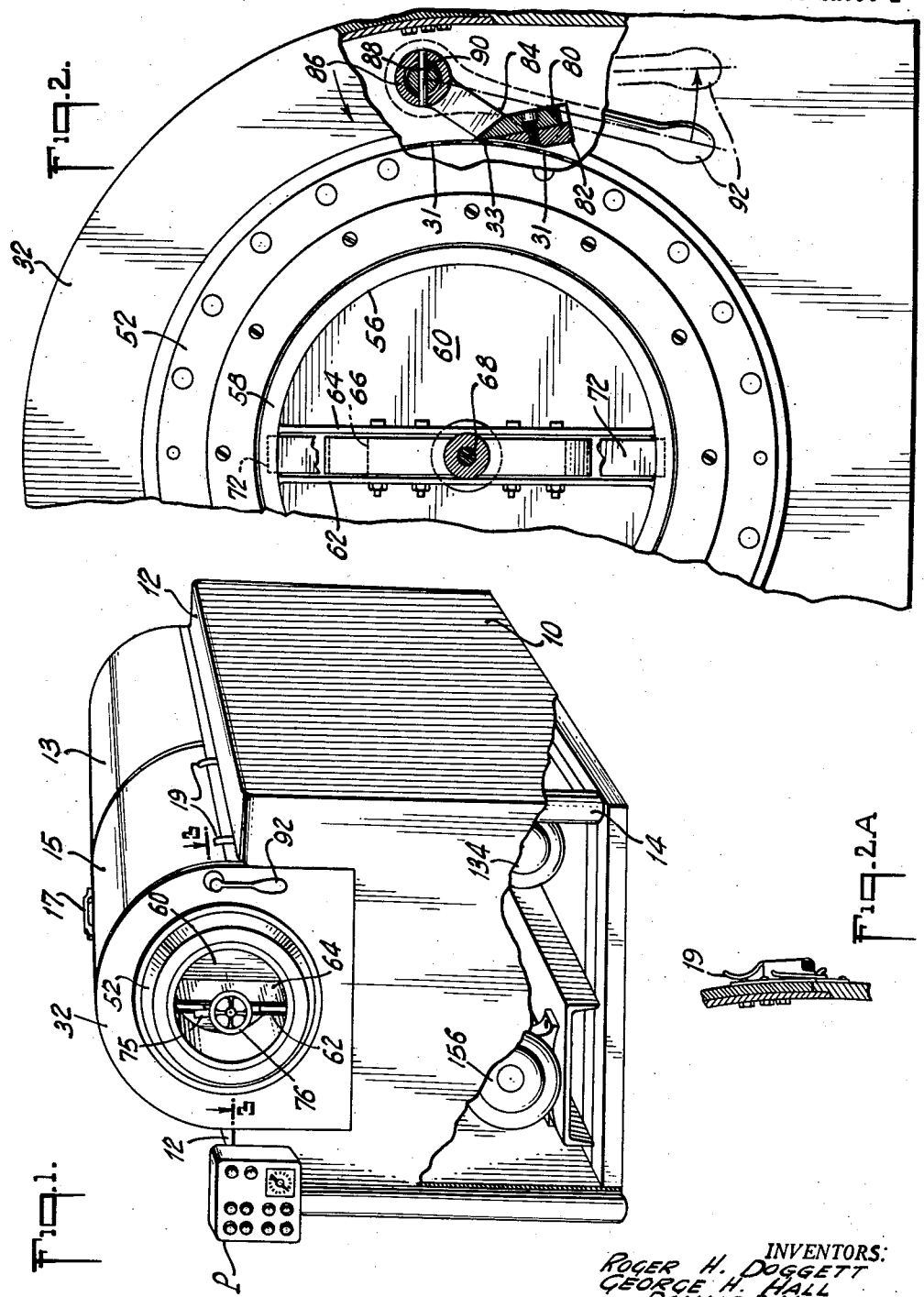
INVENTORS:
ROGER H. DOGGETT
GEORGE H. HALL
DONALD B. MONTGOMERY
RICHARD S. ROBINSON
BY Morgan, Finnegan, Durham & Pine
ATTORNEYS

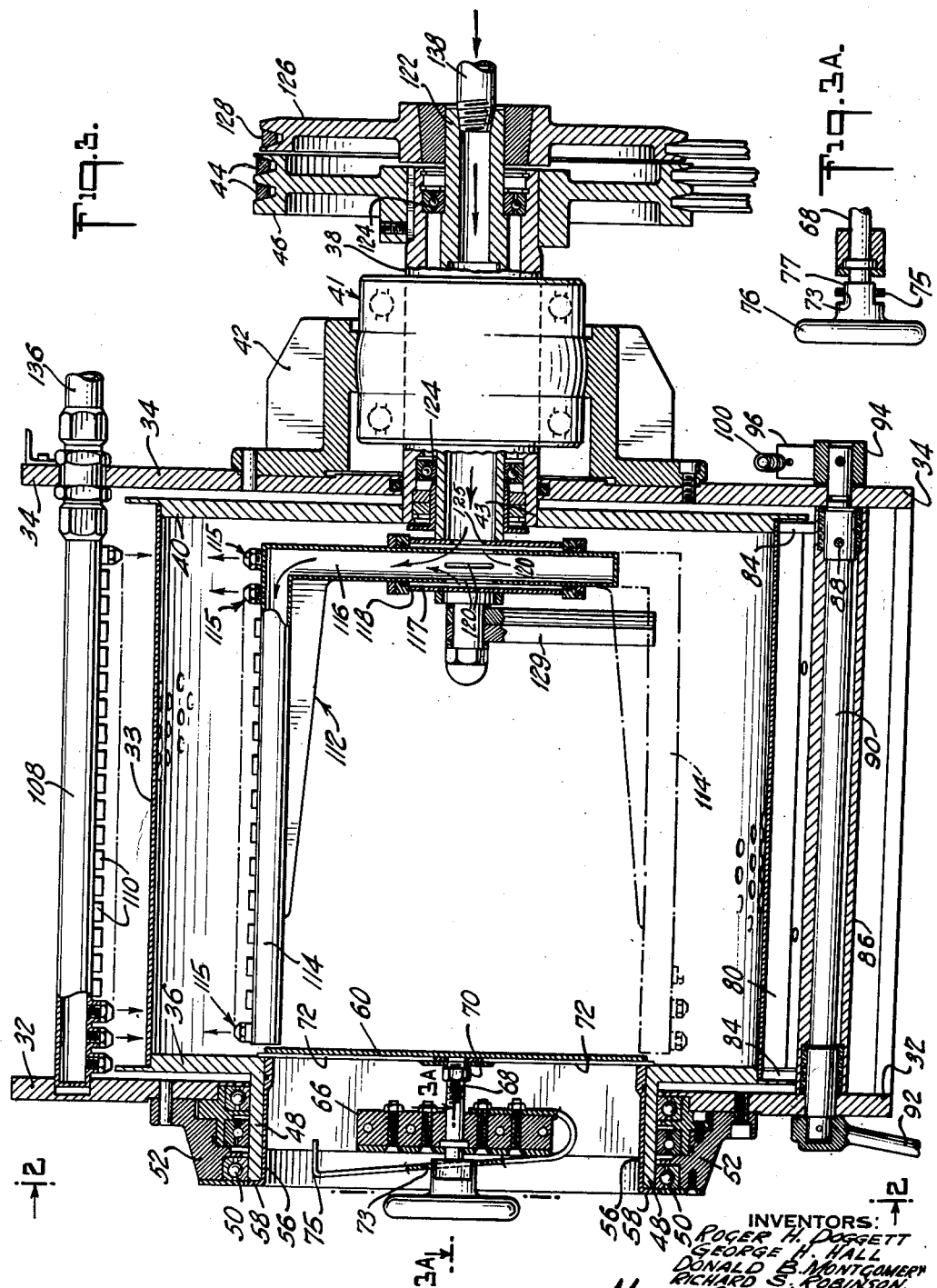

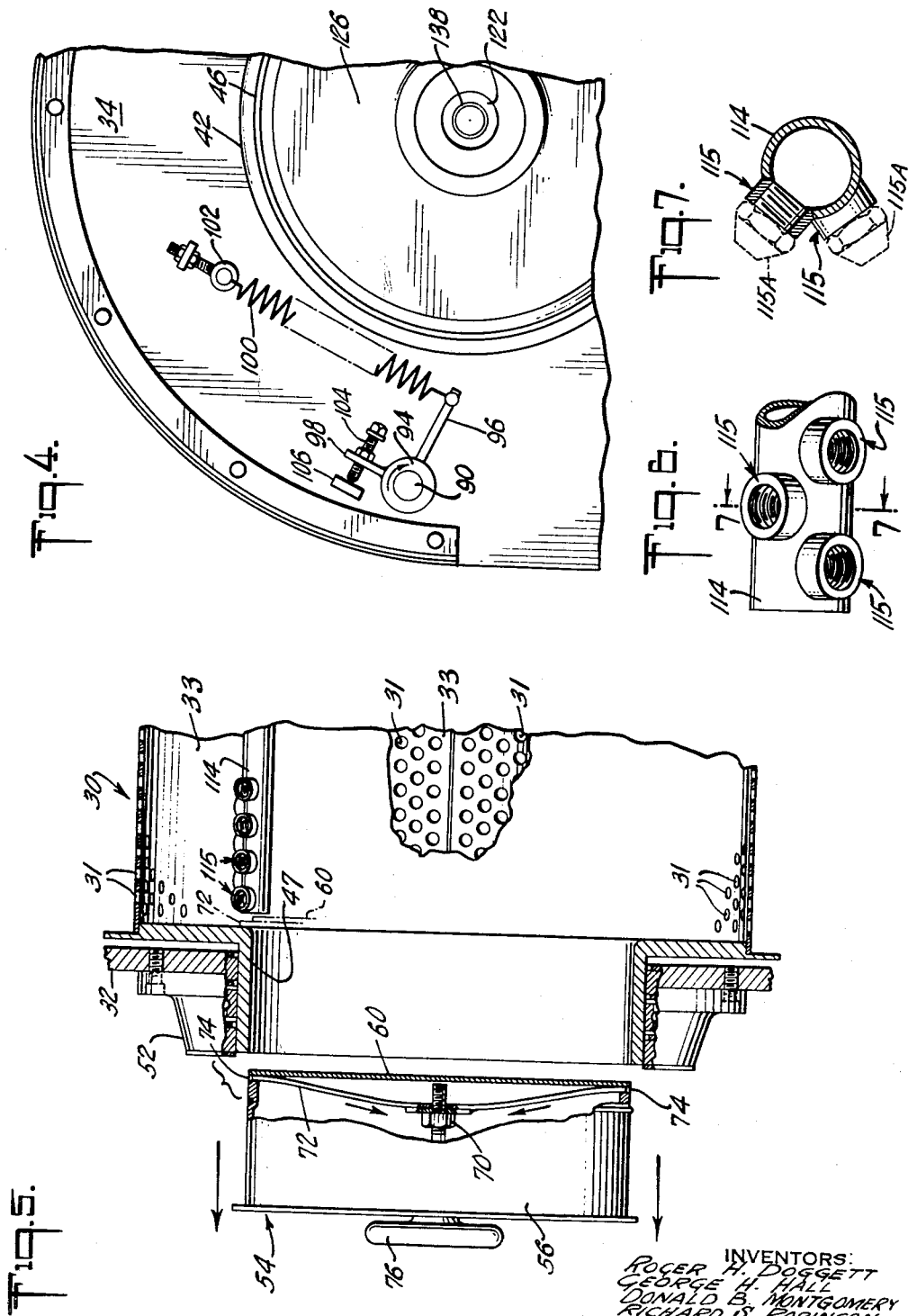

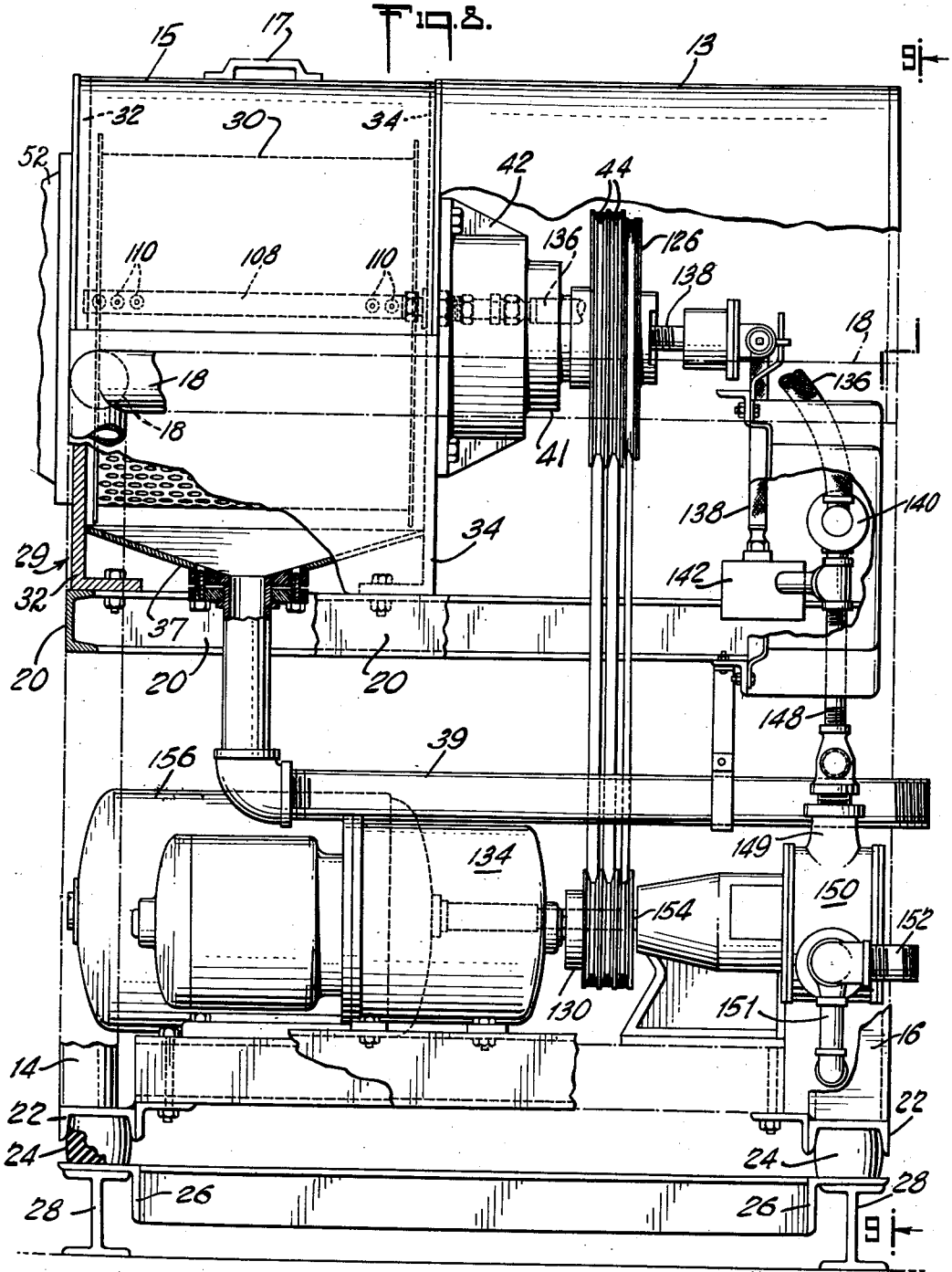

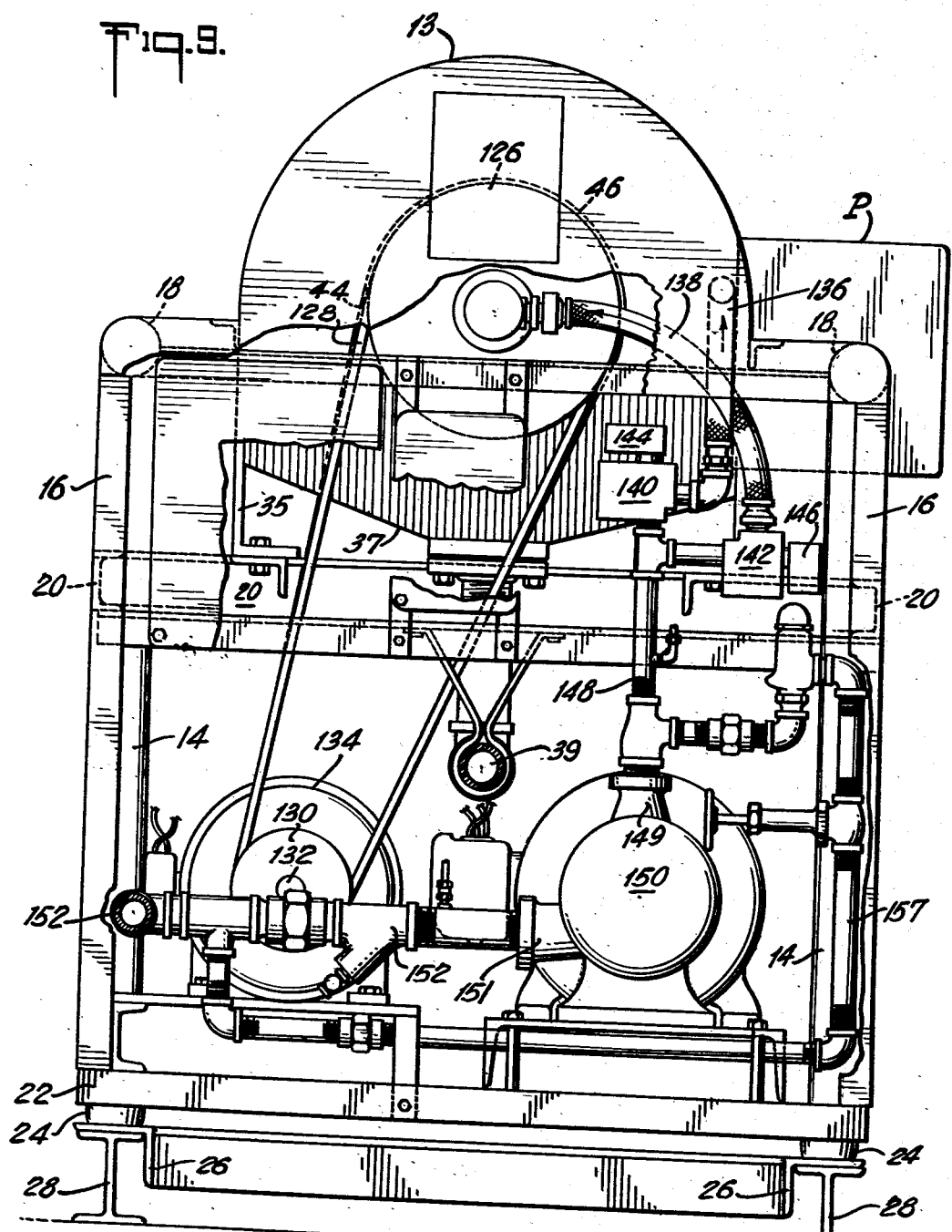

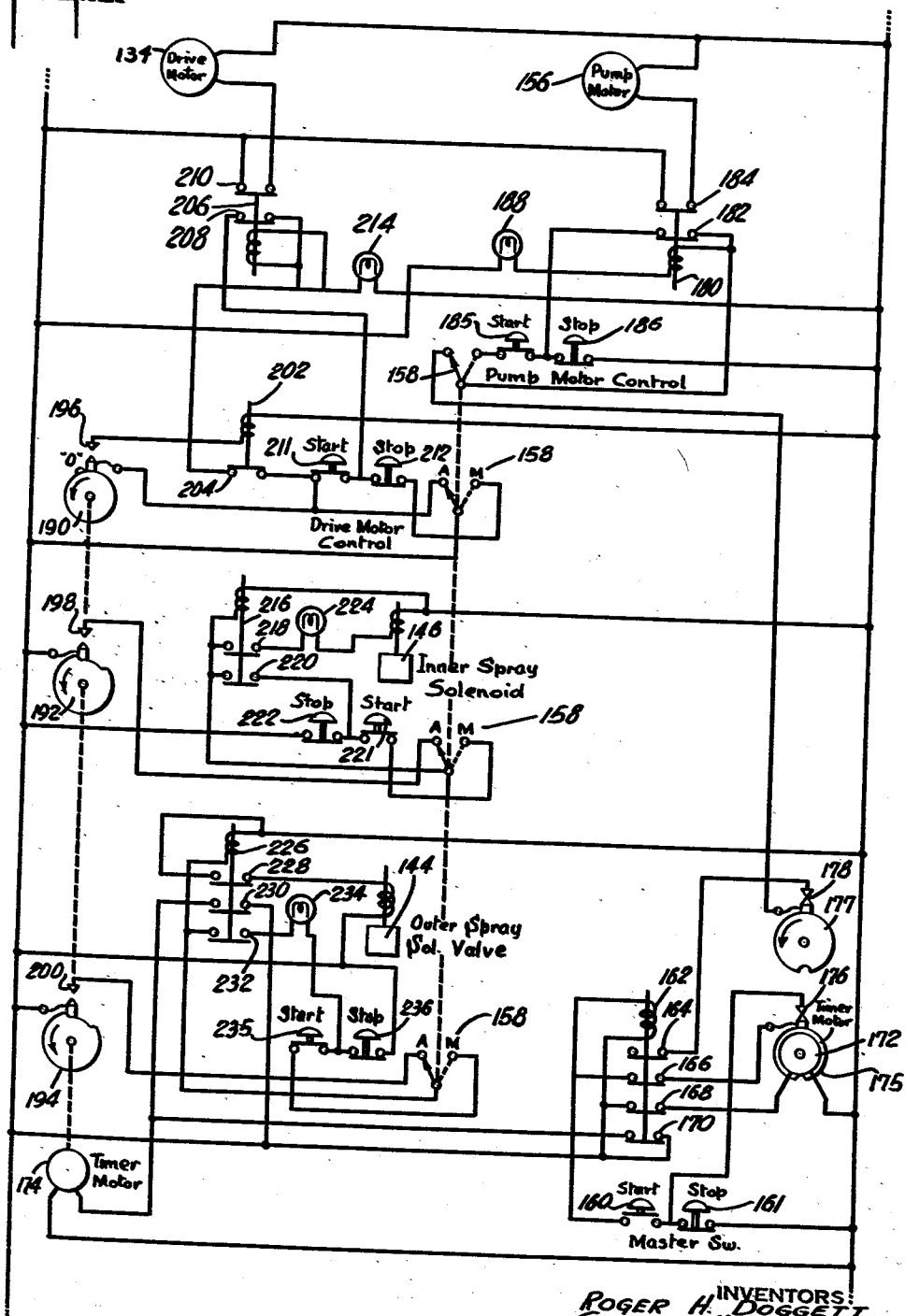

United States Patent Office 3,112,518
Patented Dec. 3, 1963

3,112,518
APPARATUS FOR CLEANING ANIMAL TISSUE
Roger H. Doggett, Natick, George H. Hall, Watertown, Donald B. Montgomery, Wayland, and Richard S. Robinson, Belmont, Mass., assignors, by mesne assignments, to Johnson & Johnson, New Brunswick, N.J., a corporation of New Jersey
Filed Mar. 30, 1960, Ser. No. 18,673
6 Claims. (Cl. 17—43)

The present invention relates to cleaning apparatus and more particularly to novel apparatus and methods for cleaning animal tissue, such as, tendon.

Objects and advantages of the invention will be obvious herefrom, or may be learned by practice with the invention, the same being realized and attained by means of the instrumentalities and combinations pointed out in the appended claims.

Animal tendon has considerable commercial value as a source of collagen, which is the basis material from which absorbable sutures and edible sausage casings can be produced. Tendon, however, as received from the packing house, is contaminated with hair, fat, blood, hide, and other impurities which must be removed before the tendon can be further processed. Heretofore, this operation has been largely, if not entirely, performed by hand using a hand scraper or knife with which each piece of tendon is individually scraped. Such operations are unavoidably slow, difficult, necessarily unsanitary, and inherently variable in the results obtained.

Likewise, attempts to mechanize this operation have proved unsuccessful. One of the most severe problems encountered in tendon cleaning is the removal of hair tendrils. Tendons are generally of elongated cylindrical shape with the result that the hair tendrils become entwined about the tendon, necessitating vigorous scraping and flushing for their satisfactory removal. Further, to obtain the desired amount of scraping, it has been necessary to manually reorient the tendon particles during the cleaning process.

The present invention is characterized by an improved apparatus including a perforated cylindrical drum mounted for axial rotation. A cutting element or knife cooperating with the drum and generally coextensive with the length thereof is positioned adjacent the outer peripheral wall of the drum. Tendon placed inside the drum is urged by centrifugal force toward the outside with portions of the tendon extending through the perforations in the peripheral wall. Such portions pass in contact with the knife and are cleaned or scraped thereby. Accompanying this operation, a spray device directs high pressure jets of water against the outside of the drum and a second spray device, rotatable inside the drum, directs high pressure jets of water against the inside thereof. The spray devices are operative to assist in urging the tendon particles through the perforations while washing the tendon free of loose impurities.

To obtain complete orientation of the tendon relative to the knife so that all portions thereof contact the knife and are thus completely cleaned, means is provided for selectively actuating the spray device and for selectively energizing the drum driving means. By starting and stopping or slowing the drum rotation and by turning the high pressure jets on and off, the tendon particles inside the drum are reoriented to insure that all parts thereof are brought into contact with the knife bar.

It is therefore an object of the present invention to provide an improved apparatus for cleaning animal tendon.

It is also an object of the present invention to provide, in an improved animal tendon cleaning device, a perforated, rotatable drum, a cutting element in close proximate relationship with the outer periphery of the drum, and means for directing high pressure jets of fluid against the peripheral wall of the drum.

A further object of the present invention is to provide, in an animal tendon cleaning machine, a rotatable drum having a perforated cylindrical wall, a cutting element adjacent the outside of the wall, a stationary spray device for directing high pressure fluid against the outside of the wall, and a rotatable spray device positioned inside the drum and movable relative thereto for directing high pressure fluid against the inside of the wall.

Another object of this invention is to provide an animal tendon cleaning machine including a rotatable drum having a perforated cylindrical wall, a cutting element adjacent the outside of the wall, a stationary spray device for directing high pressure fluid against the outside of the wall, a rotatable spray device positioned inside the drum, and means for selectively actuating the spray means and the drum drive means for obtaining reorientation of tendon inside the drum.

Another object of the present invention is to provide a novel method of cleaning animal tendon wherein the tendon is impelled against the perforated wall of a rotating drum, effecting a cutting engagement with that portion of the tendon protruding through the perforated wall and directing jets of water under high pressure against the tendon.

Another object of this invention is to provide a novel method of cleaning animal tissue wherein the tissue is impelled against the perforated wall of a rotating drum scraping that portion of the tissue protruding through the perforated drum directing jets of water against the tissue and periodically reorienting the tendon in the drum.

The invention consists in the novel parts, constructions, arrangements, combinations and improvemets herein shown and described.

The accompanying drawings, referred to herein and constituting a part hereof, illustrate one embodiment of the invention and together with the description, serve to explain the principles of the invention.

Referring now to the drawings,

FIGURE 1 is a perspective view of the mechanism embodying the present invention showing part of the outer housing broken away.

FIGURE 2 shows an enlarged partial view of the front of the mechanism illustrated in FIGURE 1 taken along lines 2—2 of FIGURE 3, parts being broken away and in section.

FIG. 2a is a detailed illustration of a suitable latch for the cover members of the mechanism shown in FIG. 2.

FIGURE 3 is an enlarged sectional view taken along the lines 3—3 of FIGURE 1.

FIGURE 3A is a detailed view taken along line 3A—3A, FIG. 3.

FIGURE 4 is a partial rear elevation of the mechanism shown in FIGURE 2.

FIG. 5 is a fragmental view, partly in section, of the front portion of the machine with the drum closure element removed.

FIGURE 6 is a detailed partial perspective view of the rotary spray and nozzles with the heads thereof shown removed.

FIGURE 7 is a sectional view taken along lines 7—7 of FIGURE 6 with the heads thereof shown phantom.

FIGURE 8 is a side elevation of FIGURE 1 as viewed from the right with portions of the cover removed and other parts broken away.

FIGURE 9 is a rear elevation taken along lines 9—9 of FIGURE 8.

FIGURE 10 is a schematic wiring diagram of a suitable control system for the preferred embodiment of the present invention.

Referring to the drawings, there is illustrated the preferred embodiment of the present invention which includes an outer sheath or covering 10 enclosing four sides of the machine and having two ledge sections 12 and separate top covers 13 and 15. These members enclose the outside of the machine, preventing injury to an operator from the machine drive mechanism. Preferably cover 13 is secured in position at ledge sections 12. However, cover 15 includes a handle 17 and is removably maintained in position by suitable locking elements 19, to provide access to the top portion of the machine.

The machine is supported on a frame, including spaced vertical tubular members 14 and channel members 16 interconnected by spaced transverse tubular members 18 and channel members 20. Members 14 or 16 are positioned at each corner of the generally rectangular machine with cross bar members 18 and 20 rigidly reinforcing the frame. Members 14 and 16 are, in turn, supported on channel members 22 to which are secured resilient shock absorbers 24, preferably of rubber, plastic or other energy-absorbing material.

The entire frame is mounted on inverted angle members 26, which, in turn, are supported on I-beams 28.

The apparatus for cleaning the tendon includes a rotatable drum of cylinder 30 mounted for rotation about a generally horizontal axis inside a housing 29. Housing 29, including vertically disposed end plates 32 and 34, side plates 35, only one of which is shown, and an inclined bottom section 37 is suitably supported at the upper left hand portion of the machine on cross bars 20. (See FIGS. 1 and 8.)

Cylinder 30 is provided with a plurality of peripheral openings 31 in the lateral or curved surface of wall 33 thereof and is mounted for rotation on a tubular shaft 38 secured to the closed end 40 of cylinder 30. As will be noted best from FIG. 3, end 40 has a circular opening 43 which provides restricted access between the hollow portion of shaft 38 and the inside of cylinder 30 for reasons set forth hereinbelow. Shaft 38 passes through end plate 34 and is suitably supported by a bearing 41 mounted in housing 42 fixed to the face of end plate 34 remote from cylinder 30. The end of shaft 38 remote from cylinder 30 is provided with a double sheave or pulley 46 adapted to be driven as described hereinbelow by a pair of endless belts 44.

The other end 36 of cylinder 30 has an annular lip 48 formed therein providing an opening 47 for access to the interior of cylinder 30. The outer surface of lip 48 is supported for rotation on suitable bearings 50 mounted in a generally annular portal section 52 fixed to the front face of end plate 32. Thus cylinder 30 is mounted for rotation between end plates 32 and 34 of housing 29 with a generally circular access 47 formed therein adjacent end plate 32.

A closure element or door 54 is provided for opening 47 to seal cylinder 30 during the rotation thereof. Door 54 includes an outer cylinder wall 56 adapted to be received snugly against the inner face of lip section 48 with an annular outer flange 58 of wall 56 positioned against the free end of lip 48 when door 54 is in fully closed position. In this closed position, end plate 60 of door 54 is located inside the inner face of terminal end 36 of cylinder 30 and forms an effective continuation thereof sealing opening 47.

To lock door 54 in fully closed position, a pair of spaced plates 62 and 64 are disposed inside cylinder wall 56 and extend to end plate 60. Plates 62 and 64 are provided with a support block 66 in which a shaft 68 is rotatably mounted axially of door 54. The end of shaft 68 adjacent end plate 60 is threaded and is mounted with a nut assembly 70 which travels therealong upon rotation of shaft 68. Nut assembly 70 in turn is fixed adjacent the midpoint of a thin, elongated bar 72. Bar 72 is preferably of spring steel and dimensioned to normally extend beyond the limits of wall 56. Wall 56 is provided with a pair of opposed slots 74 formed therein adjacent end plate 60 for accommodating the ends of bar 72. A hand wheel 76 is fixed to another end of shaft 68 to effect rotation thereof.

When door 54 is in fully closed position, hand wheel 76 is actuated to move bar 72 toward end plate 60. When bar 72 is moved into alignment with slots 74, its inherent resiliency urges it through the two slots 74 into fully extended position, inside cylinder 30. As shown in FIGURE 3, in this position bar 72 engages the inner face of terminal end 36 effectively locking door 54. To open door 54, hand wheel 76 is again actuated to move nut assembly 70 away from end plate 60. As nut assembly 70 moves away from end plate 60, bar 72 secured thereto is bent inwardly as shown in FIGURE 5 withdrawing the ends thereof from slot 74 and out of engagement with terminal end 36, thereby releasing door 54.

Means is also provided for locking hand wheel 76 against inadvertent movement. A spring bar 75 is fixed at one end to block 66 with the free end thereof disposed generally vertically between block 66 and hand wheel 76. Bar 75 is provided with an elongated slot 73 adapted to normally engage a notched section 77 in hand wheel 76. (See FIG. 3A.) With notched section 77 engaged by slot 73, hand wheel 76 cannot be rotated. To activate hand-wheel 76, bar 75 is pressed inwardly toward block 66, effecting disengagement of section 77 and 73. While bar 75 is in this position, hand wheel 76 may be freely rotated in either direction. It will be understood that hand wheel 76 is adapted to align notched section 77 with slot 73 when bar 72 is in its fully extended locking position. In this manner, when door 54 is fully closed and locked, bar 75 is returned to locking position, preventing inadvertent opening of door 54 during the operation of cylinder 30.

The scraping mechanism for cleaning the tendon comprises knife bar 80 extending substantially the entire axial length of cylinder 30 and positioned in close proximity to the outer peripheral perforated wall 33 thereof. Knife 80 is removably supported in position on a co-extensive support bar 82 which in turn is supported at each end by an arm 84 fixed to a sleeve 86. Sleeve 86 is secured by a pin 88 to a shaft 90 positioned therewithin for rotation therewith.

One end of shaft 90 passes through end plate 32 and is provided with a handle 92. Handle 92 is operative to move knife 80 and its support mechanism to and from operative scraping or cutting position adjacent cylinder 30 to and from a position remote therefrom. The other end of shaft 90 passes through end plate 34 and is provided with a cylinder cap 94. Cap 94 has a pair of radially extending legs 96 and 98 preferably spaced at right angles. Leg 96 at its free end secures one end of a spring 100. The other end of spring 100 encircles an eye bolt 102 fixed to the outer face of end plate 34.

The free end of leg 98 is provided with a threaded opening which accommodates a set screw 104 for travel therethrough. Set screw 104 is adapted to bear against a stop 106 fixed to the outer face of end plate 34 limiting the travel of knife 80 toward the outer peripheral surface of cylinder 30 with spring 100 normally urging set screw 104 against stop 106.

Fluid, such as water or brine solution, is supplied to cylinder 30 from a stationary external spray bar 108 mounted at each end in end plates 32 and 34. Spray bar 108 is provided with a plurality of spaced nozzles 110 which direct the fluid against the outer arcuate peripheral wall 33 of cylinder 30.

Fluid is also supplied to cylinder 30 from a traveling internal spray bar 112. Spray bar 112 is generally L-shaped and of circular cross-section with one leg 114 thereof generally parallel to and spaced from the inner face of wall 33 of cylinder 30. Leg 114 is provided along the length thereof with a plurality of spaced, angularly-related nozzles 115 provided with nozzle heads 115a which form a double row for directing flow of fluid against the inner peripheral face of cylinder 30.

The other leg 116 of traveling spray bar 112 is generally parallel to and spaced from end 40. A sleeve member 118 of larger diameter than leg 116 is fixed in sealed position thereabout with the inner wall of sleeve 118 in spaced relationship with the outer wall of leg 116 forming a manifold 117 thereabout. Leg 116 is provided with radially spaced elongated slots 120 extending therethrough which furnish restricted communication between the interior of spray bar 112 and manifold 117.

The fluid is supplied to spray bar 112 through a stepped hollow shaft 122 suitably supported by bearings 124 concentrically with the interior of shaft 38. Shaft 122 passes through end plates 34 and 40 and has one end fixed to the outer peripheral wall of sleeve 118; the interior of shaft 122 communicating with manifold 117 through an opening 125 in sleeve 118.

In addition to supplying fluid to spray bar 112, shaft 122 is operative to rotate spray bar 112 inside cylinder 30. A pulley or sheave 126 is secured to the end of shaft 122 remote from sleeve 118 and is driven by an endless belt 128 passing therearound. A suitable counterweight 129 is fixed to sleeve 118 opposite shaft 122 to provide dynamic stability for spray bar 112.

Belts 44 and 128 are driven, preferably in synchronism from a triple track sheave 130 secured to shaft 132 of a suitable electrical motor 134. Referring to FIGURE 3, it will be noted that pulley 126, though concentrically supported therewith, is of slightly smaller diameter than pulley 46. Thus, while belts 44 and 128 are driven at the same speed, shaft 122 is rotated at a slightly faster speed than shaft 38. This, in turn, results in relative movement between spray bar 112 and drum 30 ensuring that the entire inner peripheral face thereof is sprayed by bar 112.

Fluid is introduced into spray bars 108 and 112 through suitable hydraulic lines 136 and 138 respectively. Each line 136 and 138 is provided with a control valve 140 and 142 respectively actuated by an associated electrical solenoid 144, 146. Lines 136 and 138 are joined to a common supply line 148 connected to the discharge section 149 of a suitable rotary pump 150. The fluid is fed to pump 150 from a source of supply (not shown) through a supply line 152 connected to the inlet section 151 of pump 150. Pump 150 is driven by the output shaft 154 of a suitable electric motor 156 to selectively pump fluid under pressure (preferably about 300 p.s.i.) from the nozzles 110 and 115 of spray bars 108 and 112 against the inner and outer peripheral faces of cylinder 30. A by-pass line 157 interconects the outlet section 149 with supply line 152 when spray bars 108 and 112 are not operating.

Referring to FIGURE 10, there is illustrated a schematic electrical wiring diagram for selectively controlling the operation of the present invention from a master control panel P at the front of the machine. Firstly, there is provided a suitable selector switch 158 which adapts the control system for either automatic or manual operation. With selector switch 158 adapting the machine for automatic operation, the operator depresses a normally-open master control start button 160 to start the cyclic operation of the machine. This completes a circuit energizing relay 162, closing contacts 164, 166, 168, and 170 thereof. Closing contacts 168 completes a circuit actuating a suitable first timer motor 172. Closing contacts 170 completes a circuit actuating a suitable second timer motor 174. While contacts 166 completes a relay hold-in circuit through normally-closed switch 176 and normally-closed master control stop button 161.

Closing contacts 164 completes a circuit through another normally-closed switch 178 actuating relay 180, closing contacts 182 and 184 thereof. Closing contacts 182 completes a relay hold-in circuit through normally-closed pump motor stop switch 186 while contacts 184 complete a circuit energizing pump motor 156. Panel pilot light 188 is lit when relay 180 is actuated to indicate that pump motor 156 is in operation.

Timer motor 174 is provided with a plurality of cams 190, 192 and 194 having associated switches 196, 198 and 200, respectively. Cam 190 is mounted on timer motor 174 such that it moves out of engagement with its switch 196 immediately after pump motor 156 is energized. When cam 190 disengages normally-closed switch 196, a circuit is completed through switch 196 actuating relay 202 and closing contacts 204 thereof.

Closing contacts 204, in turn, energizes another relay 206, closing its contacts 208 and 210. Closing contacts 208 completes a relay hold-in circuit through normally-closed drive motor stop switch 212 while contacts 210 complete a circuit energizing motor 134. Panel pilot light 214 is lit when relay 206 is actuated to indicate that drum drive motor 134 is in operation. It will be understood that circuit overload is prevented by starting motor 134 after pump motor 156 has been energized rather than simultaneously therewith.

During the operation of timer motor 174, cam 192 thereof is moved into engagement with normally-open switch 198 completing a circuit energizing relay 216, closing contacts 218 and 220 thereof. Closing contacts 218 energize solenoid 146 opening its associated control valve 142 to admit fluid through hydraulic line 138 to rotary spray bar 112. Contacts 220, in turn, complete a relay hold-in circuit through normally-closed inner spray stop switch 222. Panel pilot light 224 is lit when relay 216 is energized to indicate that spray 112 is in operation.

Preferably simultaneously with cam 192 engaging switch 198, cam 194 engages normally-open switch 200, completing a circuit energizing relay 226, closing contacts 228, 230 and 232 thereof. Closing contacts 228 completes a circuit energizing solenoid 144, opening control valve 140, introducing fluid in hydraulic line 136 to spray bar 108. Closing contacts 232 completes a relay hold-in circuit including panel pilot light 234 and normally-closed outer spray stop button 236 while contacts 230 complete a hold-in circuit for timer motor 174. To enable drum 30 to attain its preferred rotational speed, cams 192 and 194 engage their associated switches 198 and 200, after motor 134 has reached its optimum operating speed.

The hold-in circuit for timer motor 174 ensures that timer motor 174 remains energized even though timer motor 172 concludes its operating cycle opening contacts 170 before timer motor 174 reaches the end of its cycle. Further, so long as contacts 170 of relay 162 are closed, timer motor 174 remains energized for repetitive cycling thereof.

At the end of the cyclic operation of the machine, a suitable cam 175 provided on timer motor 172 opens switch 176, deenergizing relay 162. This breaks the circuit energizing relay 180, deactuating pump motor 156. Likewise the circuit through contacts 170 to timer motor 174 is broken. However, timer motor 174 remains energized through its hold-in circuit until it concludes its operating cycle.

At the end of the cyclic operation of timer motor 174, after timer motor 172 has timed out, cam 190 opens its switch 196 to deenergize relay 202, stopping drive motor 134. In like manner, cams 192 and 194 engage their associated switches 198 and 200, deenergizing relays 216 and 226 and their associated solenoids 146 and 144 respectively. In addition, deenergizing relay 226 breaks the hold-in circuit for timer motor 174, stopping the operation thereof.

Also, in the event it is desired to operate pump motor 156 intermittently during the cyclic operation of timer motor 172, a suitable cam 177 may be provided on timer motor 172. This cam 177 is operative to open switch 178, deenergizing relay 180 and pump motor 156. Preferably, cams 175 and 177 are in synchronism such that pump motor 156 is energized as long as timer motor 172 is operating. However, by suitably shaping or adjusting cams 175 and 177 on timer motor 172, any desired timed operation between pump motor 156 and timer motor 172 can be accomplished.

If manual operation is desired, selector switch 158 is moved from automatic to manual setting. Timer motors 172 and 174 are started in like manner to automatic operation of the machine. However, to energize relay 180, normally-open pump motor start switch 185 must be manually depressed to actuate pump motor 156.

In like manner, after cam 190 of timer motor 174 disengages its switch 196, the normally-open drive motor start switch 211 must be depressed to energize relay 206 to actuate drive motor 134. Similarly, after cam 192 engages its switch 198, inner spray start switch 221 must be pressed to energize 216 to actuate solenoid 146. And, after cam 194 engages its switch 200, normally-open outer spray start button 235 must be depressed to energize relay 226 to actuate solenoid 144.

It will be understood that after the various start switches have been depressed, their associated hold-in circuits maintain the respective relays in energized condition, until either the respective stop buttons are depressed or the timer motors 172 and 174 complete the cyclic operation of the machine.

In the event one of the stop buttons is depressed de-energizing its associated relay, such relay may be re-energized by depressing its start switch any time prior to completion of the cycled operation of timer motors 172 and 174, as explained above in connection with the automatic operation of the machine.

In operation of the machine hand wheel 76 is rotated to move nut assembly 70 along shaft 68 toward the left as viewed in FIGURE 5. Bar 72 is thus withdrawn from locking position and door 54 removed from operative position in lip 48, providing access to the inside of drum 30. Tendon to be cleaned is then placed inside drum 30. With the tendon in drum 30, door 54 is returned to operative position in lip 48 with flange 58 of the door 54 abutting the free end of lip 48. Hand wheel 76 is then actuated to move nut assembly 70 toward the right as viewed in FIG. 5. When bar 72 is aligned with slots 74 in wall 56, it returns to its normal fully extended position, thus locking door 54.

The operator then pivots handle 92 of the scraping mechanism toward the left as viewed in FIG. 2, moving knife bar 80 into position adjacent the outside of drum 30 and sets the selector switch 158 on control panel P for either automatic or manual operation, as desired. The following description is for automatic operation, it being understood that manual operation may be accomplished as described hereinabove. This completes the preliminary steps in the cleaning operation.

The operator then depressed master control start button 160, energizing timer motors 172 and 174 and starting the automatic cyclic operation of the machine described hereinabove. Drum 30, with the tendon therein, is rotated by motor 134, preferably at approximately 600 r.p.m. The centrifugal force generated by rotating drum 30 urges the tendon particles against the cylindrical wall 33 thereof with portions of the tendon projecting through perforations 31 into cutting engagement with knife 80 positioned against the outside of drum 30.

After drum 30 has attained its desired speed, timer motor 174 actuates the solenoids 144 and 146 to admit fluid to travelling spray bars 112 and stationary spray bar 108. Preferably the fluid is heated to approximately 75° C. and is fed by pump 150 at about 300 p.s.i. Fluid from bars 108 and 112 is directed against the inner and outer periphery wall 33 of drum 30 and drains through perforations 31 onto bottom section 37 and into a suitable hydraulic drain line 39 for exit from the machine.

Approximately one quarter of the way through the cyclic operation of the machine, cams 190 and 192 actuate their respective switches 196 and 198 to stop rotation to drum 30 and inner spray bar 112 and to shut off fluid supply to bar 112.

This causes the tendon particles to fall from their impelled position against the periphery of drum 30 to the bottom thereof, effecting automatic re-orienting of the tendon particles.

After a delay sufficient to ensure the re-deposit of the tendon in the drum bottom, cams 190 and 192 de-actuate their respective switches 196 and 198, re-starting the rotation of drum 30, spray bar 112 and re-admitting fluid to bar 112.

This intermittent operation of drum 30 and spray 112 is preferably repeated twice during each cyclic operation of the machine to ensure complete re-orientation of the tendon particles in contact with knife bar 80. It will be upnderstood, however, that by suitably shaping cams 190 and 192, the number of automatic intermittent operations thereof may be increased or decreased, as desired, during the cycle. With manual operation, each depression of the appropriate start and start button effects intermittent operation of its associated mechanism.

Further, by suitably shaping cam 190, drum 30 and spray bar 112 need not come to a complete stop but may be merely slowed and then returned upon de-actuation to normal operating speed by re-energizing drive motor 134 before drum 30 stops rotating.

Likewise, by suitably shaping the several cams or shifting them relatively on their associate timer motors 172 and 174, the synchronism or relative actuating times of their associated mechanisms can be selectively controlled.

At the end of the cyclic operation of the machine, the operator rotates hand wheel 76 to effect unlocking of door 54 and opens drum 30. The operator may then, depending on the condition of the tendon, manually re-orient it and re-cycle the machine to obtain more thorough cleaning of the tendon or remove the cleaned tendon and replace it by a fresh batch of uncleaned material.

Upon completion of the cyclic operation, the operator changes selector switch 158 from automatic to manual setting and he starts the drive motor by depressing master control start switch 160 and drive motor start switch 211. The drum is then preferably rotated at full speed for approximately one minute to spin dry and further re-orient the tendon.

We claim:

1. In a tendon cleaning machine, the combination comprising a drum having a perforated cylindrical wall, means mounting said drum for rotation about a generally horizontal axis, drive means for rotating said drum, a cutting device, means mounting said cutting device parallel to the axis of rotation of said drum and in close proximate relationship with the outer surface of said wall, a first spray device, means mounting said first spray device in fixed position for directing jets of water against the outer surface of said wall as it travels therepast, a second spray device mounted for travel within said drum for directing jets of water against the inner face of said wall, means for travelling said second spray device, means for supplying water to each of said devices, and control means for selectively actuating said drum drive means, said second spray rotating means and second spray devices.

2. The invention as defined in claim 1 wherein said second spray device travelling means includes means for affecting relative movement between said drum and said second spray device, whereby the jets of water from said second spray device are directed against successive sections of the entire inner face of said wall.

3. The invention as defined in claim 1 wherein said drum is provided with an access formed in one terminal end thereof and including a closure element for said access, and means for selectively locking said closure element in operative position in said access, and means for maintaining said closure element in operative locked position against inadvertent opening thereof during the operation of said drum.

4. Apparatus for cleaning animal tendon comprising a drum having a perforated cylindrical wall, a shaft secured concentrically of said drum and mounting said drum for rotation about a generally horizontal axis, a sheave mounted on one end of said shaft, knife means, supports mounting said knife means parallel to the axis of rotation of said drum for movement into close proximate relationship with the outer surface of said wall, a first spray device, means mounting said first spray device in spaced relationship with the outer surface of said wall for directing jets of water thereagainst, a second spray device positioned in spaced relationship with the inner surface of said wall for directing jets of water thereagainst, a second shaft, means connecting one end of said second shaft to said second spray device for rotating said second spray device inside said drum, a second sheave mounted on the end of said second shaft remote from said second spray device, common drive means for rotating said first and second sheaves, pump means for pumping water from a source of supply to said first and second spray devices, operating means for said pump means, a control valve for each of said spray devices for controlling the flow of water from said pump means to its associated spray device, a solenoid associated with each of said control valves and common control means for selectively actuating said common drive means, said pump operating means and said solenoids.

5. The invention as defined in claim 4 wherein said common control means comprises an operating circuit including timing elements, means operatively associating said pump operating means, said common drive means and said solenoids with one of said timing elements, and means interconnecting said timing elements to selectively actuate said pump operating means, said common drive means and said solenoids in timed cyclic relationship.

6. The invention as defined in claim 4 wherein said first and second shafts are tubular with said second shaft positioned concentrically within said first shaft and wherein said second sheave is of smaller diameter than said first sheave for effecting relative movement between said drum and second spray device.

References Cited in the file of this patent

UNITED STATES PATENTS

| | | |
|---|---|---|
| 1,453,711 | Hoting | May 1, 1923 |
| 1,850,951 | Allbright | Mar. 22, 1932 |
| 1,990,425 | Buck | Feb. 5, 1935 |
| 2,355,405 | Vucassovich | Aug. 8, 1944 |

FOREIGN PATENTS

| | | |
|---|---|---|
| 215,419 | Germany | Oct. 29, 1909 |